(No Model.) 4 Sheets—Sheet 1.
F. H. RICHARDS.
AUTOMATIC WEIGHING MACHINE.

No. 585,979. Patented July 6, 1897.

Witnesses:
O. W. Smith
Fred. J. Dole.

Inventor,
F. H. Richards.

(No Model.) 4 Sheets—Sheet 3.

F. H. RICHARDS.
AUTOMATIC WEIGHING MACHINE.

No. 585,979. Patented July 6, 1897.

Witnesses:
O. W. Smith
Fred. J. Dole.

Inventor,
F. H. Richards.

(No Model.) 4 Sheets—Sheet 4.

F. H. RICHARDS.
AUTOMATIC WEIGHING MACHINE.

No. 585,979. Patented July 6, 1897.

Witnesses;
O. W. Smith
Fred. J. Dole.

Inventor;
F. H. Richards.

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 585,979, dated July 6, 1897.

Application filed December 10, 1896. Serial No. 615,199. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing and delivering various kinds of granular and other free-flowing materials.

With respect to one of its features the invention comprehends the provision of means for applying to the weighing mechanism a variable amount of resistance.

In the form thereof illustrated I apply to the weighing mechanism, toward the initial stage of the loading period, a progressively-increasing resistance, which culminates at the commencement of the poising period, at which time the resistance is preferably increased comparatively suddenly, so that the load-receiver or bucket cannot descend below the so-called "poising-line" prematurely and with an underload.

Another object of the invention is to provide improved stream-controlling means embodying a plurality of stream-controlling devices for obtaining a more efficient reduction of the supply-stream at proper points in the operation of the machine and to cut off the same, such stream-controlling members being also operative to insure the free passage of the supply-stream toward the load-receiver when the bucket is in its stream-receiving position.

Another object of the invention is to provide means in conjunction with the shiftable load-discharge member of the weighing mechanism, which in the present case is the closer, for preventing the return movement of said load-discharge member on the discharge of the load and until the latter is fully emptied from the bucket.

Figure 1:
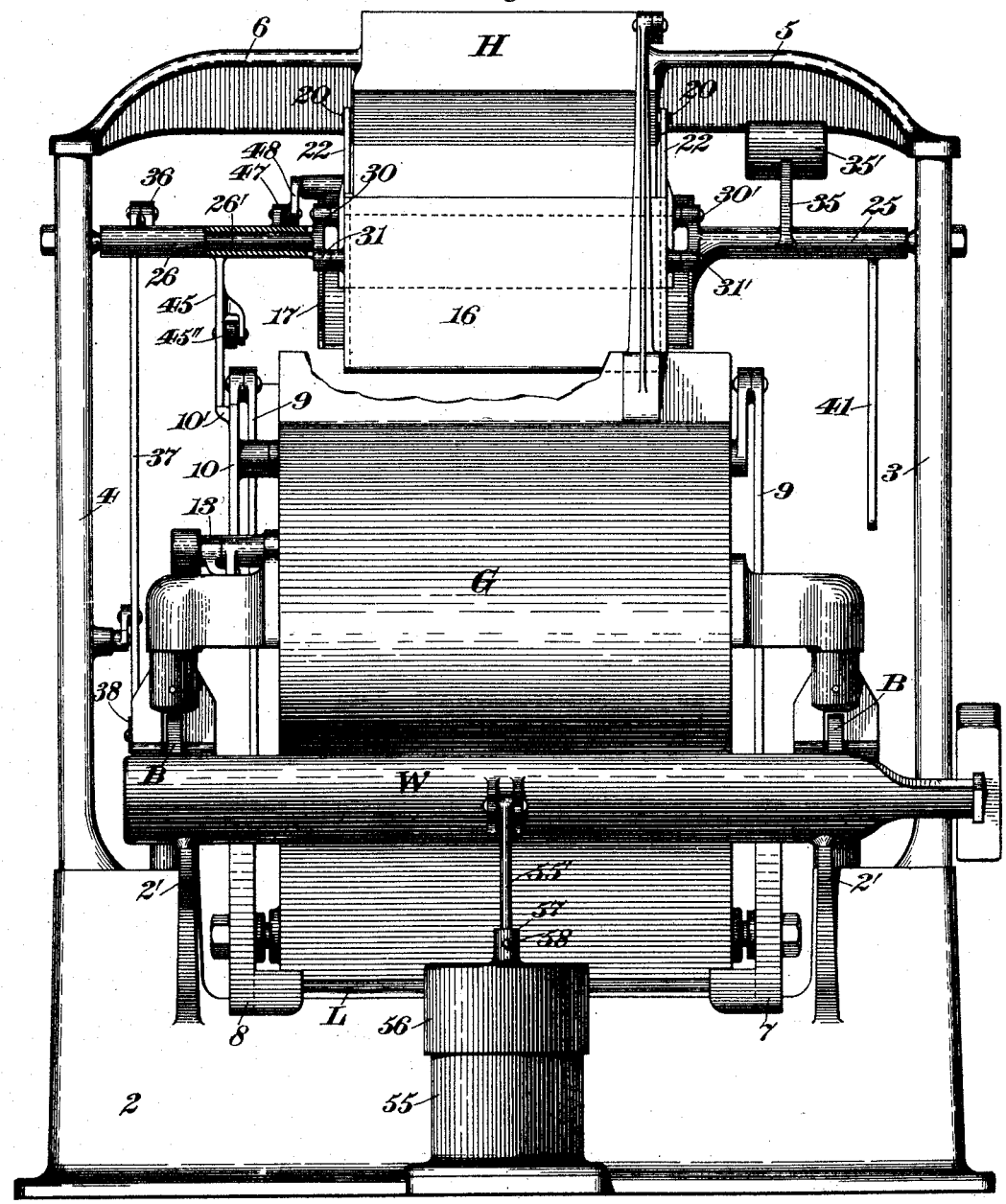
Figure 2:
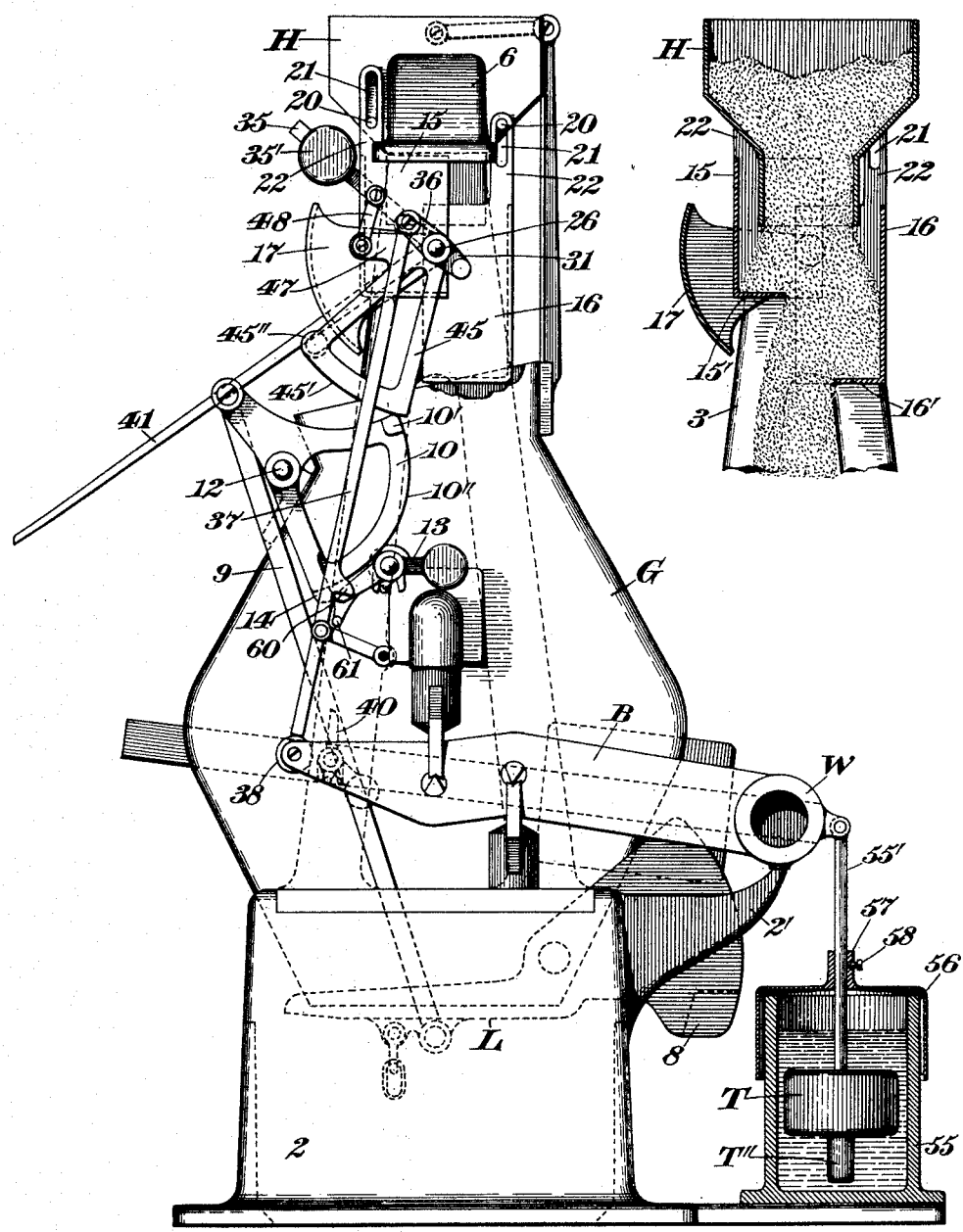
Figure 3:
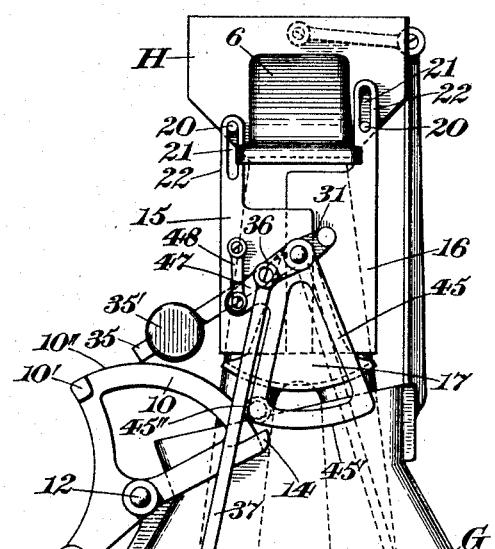
Figure 6:
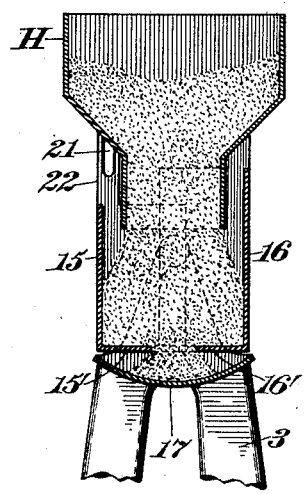
Figure 4:
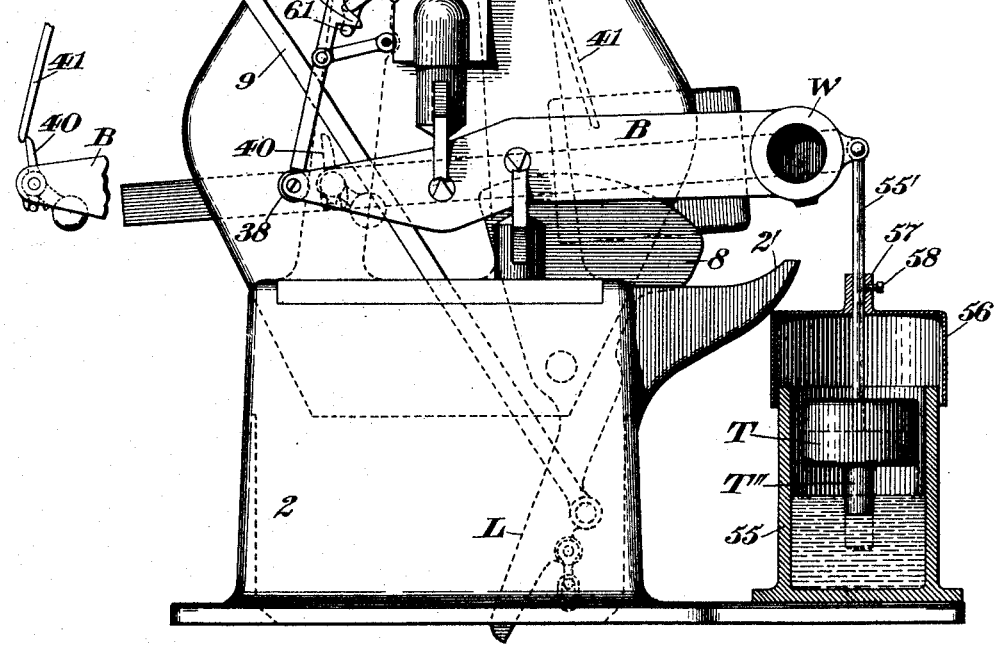
Figure 7:
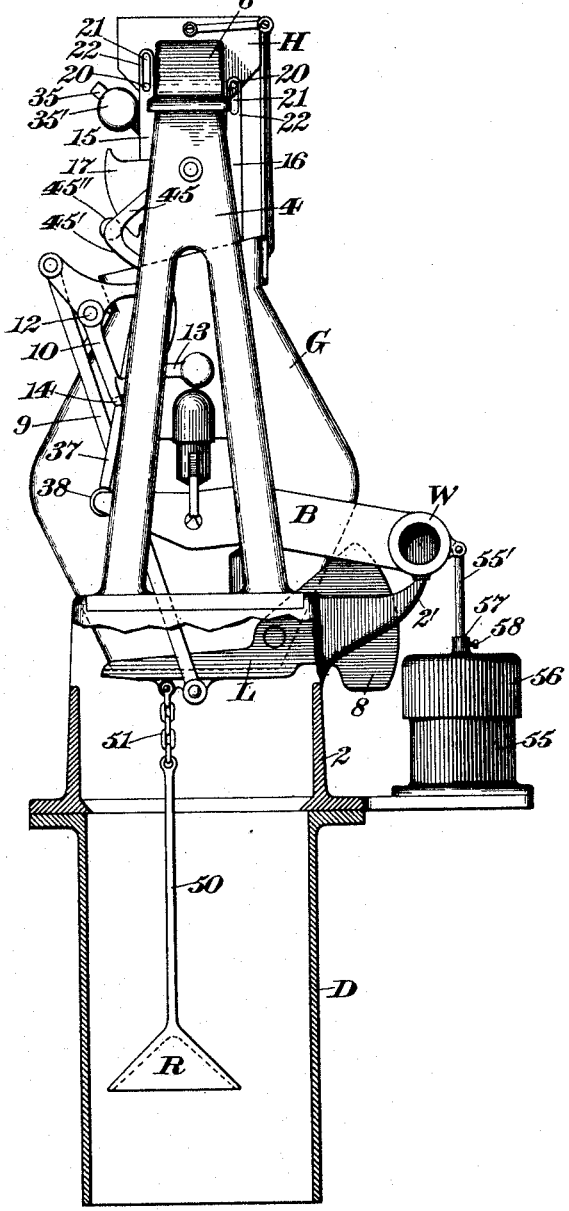
Figure 8:
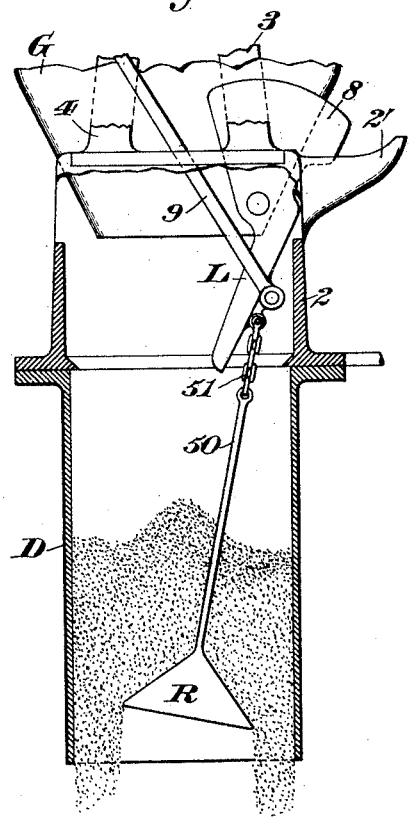

In the drawings accompanying and forming part of this specification, Figure 1 is a front elevation of a weighing-machine embodying my present improvements, and it illustrates the positions occupied by the respective parts at the commencement of operation. Fig. 2 is an end elevation as seen from the left in Fig. 1, the parts being in positions corresponding therewith. Fig. 3 is a view similar to Fig. 2, and it illustrates the supply to the bucket having been stopped and the closer of said bucket open to discharge the load. Fig. 4 is a detail view of the means employed for holding the stream-controlling mechanism at the drip position. Figs. 5 and 6 are detail views, in longitudinal central vertical section, of the valve mechanism, showing the same in its two extreme positions. Fig. 7 is an end elevation of the weighing-machine, and it also illustrates the regulator in operative connection with the closer; and Fig. 8 is a detail view of the lower part of the machine, showing such regulator in its working position and also illustrating as lodged thereon the load discharged from the bucket.

Similar characters designate like parts in all the figures of the drawings.

The framework for supporting the various sets of mechanisms may be of any suitable structure, and in the form illustrated it comprises the chambered base 2, the end frames 3 and 4, which rise therefrom, and the brackets 5 and 6, which extend oppositely from the hopper or chute, said parts being connected to each other in a suitable manner and the hopper constituting a convenient means for delivering the supply of material toward the load-receiver.

The weighing mechanism is made up of a load-receiver and a counterweighted scale-beam therefor, such load-receiver in the present case being designated by G and consisting of a bucket of the well-known single-chambered vertically-reciprocatory type.

The scale-beam is designated by B, and it will preferably be mounted upon the base 2, as usual, and will have supports near its poising side for sustaining the load-receiver or bucket G. The beam B consists of a pair of longitudinal parallel arms joined at the rear by the combined counterweight and connecting-shaft W.

The bucket G will have the usual discharge-outlet from which the loads of material are intermittingly discharged into the discharge-conduit D, (see Figs. 7 and 8,) first having passed through the chambered supporting-base 2, said discharge-conduit being bolted or otherwise secured to said base.

For controlling the discharge-outlet of the bucket I provide a closer which is designated by L. The closer proper consists of a flat plate which fits against the lower edge of the bucket when it is shut and is pivotally connected to the bucket G at one side the discharge-outlet thereof. The closer will be also counterweighted, as at 7 and 8, the purpose of the counterweights being to return said closer to its shut position when the load has been discharged from the bucket.

The closer-holding means include a latch and a toggle, which latter is preferably of the inverted type, said toggle consisting of the relatively long rod 9 and the rocker 10, which is carried by the rock-shaft 12 on the bucket G, the rod 9 being pivotally connected to the rocker 10 and also to the closer L in such a manner that the several toggle-pivots will be approximately in line when the closer is shut. The latch is designated by 13, and it is preferably counterweighted and pivotally mounted upon a suitably-positioned bracket carried on the end wall of the bucket. In the form shown the latch swings upward to engage the coöperative arm 14 of the rocker, as indicated in Fig. 2, it being evident that the latch is disengaged from the rocker 10 by a downward pressure thereon, so that when this operation takes place the closer L will be freed of all restraint and can be forced open by the weight of the load resting thereon within the bucket.

In conjunction with the stream-supplying means I employ a series of stream-controlling members, a pair of which are designated by 15 and 16, respectively, (see Figs. 5 and 6,) the third member being designated by 17 and being an oscillatory valve or cut-off adapted to arrest the supply-stream, which is diminished by the joint action of the two stream-reducers 15 and 16.

The stream-reducers 15 and 16 are preferably carried by the hopper H for reciprocatory movement—in the present instance in a vertical plane—they being also movable in parallelism.

The stream-reducer 15 has the inwardly-projecting flange 15', while the complemental member has a similar flange 16', which together constitute a means for diminishing the volume of the supply-stream, which flows from the hopper H as said flanges are moved toward each other, the distance between their discharge edges gradually decreasing during the loading period, said flanges when the load is finished being opposite each other, or in alinement, as represented in Fig. 6, the supply-stream then being an attenuated one, whereby the valve 17, by being projected across the path of such attenuated stream, may cut off the same and prevent its passage to the loaded bucket. The opposite end walls of the hopper H, near the front and rear sides thereof, will be furnished, respectively, with projecting pins or studs 20, about which extend the walls of the longitudinal slots 21 in the four arms 22 of the two stream-reducers 15 and 16 at opposite sides thereof. The walls of the stream-reducer 15 will also preferably overlap those of its mate 16, as indicated in the several end elevations, whereby a lateral escape of the material as it flows toward the bucket is prevented.

The valve 17, which is oscillatory, is supported between the end frames 3 and 4, it being carried by a two-part shaft the respective sections of which are designated by 25 and 26, said shaft-sections having bearings in the outer extremities thereof for receiving journals or pivot-screws on the two end frames 3 and 4.

For obtaining the necessary operation of the two stream-reducers 15 and 16 I prefer to operatively connect them with the valve. The left-hand end wall of the valve (see Fig. 1) is furnished with two rock-arms 30 and 31, oppositely disposed, and which are pivoted, respectively, to the two stream-reducers 15 and 16, the opposite end wall of the valve being furnished with a similar pair of rock-arms 30' and 31', likewise jointed to the two stream-reducers.

It will be evident that as the valve swings from its wide-open position, as represented in Fig. 5, to its shut position, as shown in Fig. 6, to cut off the supply the arms 31 and 31', and consequently the stream-reducer 16, will be elevated, the stream-reducer 15, through the medium of the arms 30 and 30', being lowered, whereby the flanges 15' and 16' will be moved toward each other as the valve closes to progressively reduce the volume of the supply-stream which flows toward the bucket, the stream being subsequently wholly cut off by the valve 17 when it crosses the path of the reduced supply-stream or drip during the second stage of its closing movement or when it is released at the conclusion of the drip-supply period, as will hereinafter appear.

For actuating the valve 17 to close the same and for also operating the two stream-reducers 15 and 16 to obtain the necessary reduction in the volume of the supply-stream I provide the rearwardly-extending counterweighted arm 35, carried by the shaft-section 25, its weight being designated by 35', and said counterweighted arm or valve-closing actuator will exert a constant valve-closing action as it drops from its normal position in Fig. 2, which, however, is controlled or limited by the weighing mechanism, and the means for obtaining this last-mentioned result will now be set forth. The shaft-section 26 is furnished with a rearwardly-extending short crank-arm 36, to which is pivoted the connecting-rod 37, the free end of the latter bearing against a projection or antifriction-roll 38 on an arm of the beam B, said rod being also connected to the framework of the machine by a suitable guide-link, and it will be evident that as the beam descends during the loading period the closure of the valve, and consequently the operation of the two stream-reducers 15 and 16, will be obtained by the dropping of the counterweighted arm or valve-closing actuator 35, the action of said arm being in correspondence with the movement of the weighing mechanism.

The scale-beam B constitutes a convenient and suitable valve-opening actuator, it being adapted, as it rises from its lowermost position, as shown in Fig. 3, to that indicated in Fig. 2, to transmit an upward thrust to the rod 37, which is communicated to the operatively-connected valve 17, it forcing the same open and simultaneously moving the two stream-reducers 15 and 16 away from each other, and on such action of the latter they act as agitating devices for loosening up the mass of the material between the hopper and flanges 15' and 16', respectively, sufficiently to insure the free passage of the material to the load-receiver or bucket G.

Means are provided for intercepting the closing movement of the valve when the major part of the load has been supplied to the bucket, a stop carried by the weighing mechanism being preferably employed for this purpose, such a stop being represented at 40 and being of the "by-pass" type and being disposed in the path of movement of the depending rod 41, which is rigidly connected to the valve-shaft section 25, so that at the commencement of the poising period said by-pass, which is on an arm of the beam B, will engage the rod 41 (see Fig. 4) and will thereby hold the valve temporarily against further closing movement, the discharge edge of the valve at this time being substantially in vertical alinement with the discharge edge of the flange 15'.

The two flanges 15' and 16' at this point will be quite close to each other and will have materially reduced the volume of the supply, said supply being in the form of a drip. This reduced stream will flow into the bucket for a relatively brief period of time to complete the partial load therein, and when the load has been completed the beam and bucket will be carried below the so-called "poising-line," the by-pass 40 moving therewith and descending below the drip-rod 41 will release said rod, and consequently the valve, whereby the latter will be given its final closing movement by the falling of the counterweighted arm 35 to cut off the reduced stream, which flows between the discharge edges of the flanges 15' and 16'.

In connection with the stream-controlling mechanism and with the shiftable load-discharge member of the weighing mechanism I provide reciprocally-effective stops, the one operative with the stream-controlling mechanism being designated by 45, while the rocker 10 constitutes its companion, said stops being both of open segmental shape and the stop 45 being preferably formed integral with the longitudinal sleeve or collar, which is loose on the reduced portion 26' on the shaft-section 26. (See Fig. 1.)

The function of the stop 10 is to limit or prevent the passage of material to the bucket or load-receiver during the discharge of a load, and hence limiting the action of the stream-reducers 15 and 16 and the valve 17, with which the coacting stop 45 is operative, and the office of the latter is to limit the opening of the closer while any part of the supply is being delivered to the bucket. The longitudinal sleeve or collar 26 is furnished with a lug 47, to which is pivoted the short link 48, said link being likewise connected to the stream-reducers. (See Figs. 1, 2, and 3.) The operation of these coacting stops will be understood from an inspection of Figs. 2 and 3 of the drawings.

In Fig. 2 the valve 17 and the two stream-reducers 15 and 16 are represented as being in their wide-open positions, so that a stream of relatively large volume can pass between the two discharge edges of the flanges 15' and 16' and enter the bucket G.

The auxiliary stop or boss 10' on the stop 10 is contiguous to the curved face 45' of the stop 45, which is connected to the valve mechanism, so that should the latch 13 be tripped too soon the oscillation of the stop 10 will be positively prevented by its mate 45, the closer L being thereby held shut.

As the valve 17 is closed the stream-reducers 15 and 16 will be moved toward each other by reason of the connections thereof with the valve, so that the stop 45 will be moved in unison therewith by reason of the link 48, which is connected to the stream-reducer 15 and which is forced downward with the stream-reducer, which action will swing the stop member 45 bodily to the right.

When the stream or supply has been fully cut off, the stop member 45 will have crossed the plane of the curved stop-face 10'' of the stop 10, so that the latter, provided the latch 13 has been tripped, can rock about its center by the opening of the closer, and in so doing said curved stop-face will run in contact with the roll or auxiliary stop 45'', whereby retractive movement of the stop 45, and hence the various stream-controlling members 15, 16, and 17, will be prevented and until the stop 10 has been returned to its normal position by the shutting of the closer, when said stop 10 will release its mate 45, as will be clearly evident.

In connection with the closer L, I provide a regulating device (see Figs. 7 and 8) which may be located for operation within the discharge-conduit D, said regulator being designated by R and being preferably conical to permit the free gravitation of the material from its face. Said regulator R, which is operatively connected with the closer L, is disposed at some distance below the closer and is intended to receive the load discharged from the bucket, whereby the pressure of the load of material acting against said regulator will be sufficient to hold the closer open to permit the complete emptying of the bucket.

The regulator R, which is freely movable in the discharge-conduit D, is furnished with a relatively long stem 50, which extends from its apex and which is preferably connected to the closer by flexible means, such as the chain 51.

On the opening of the closer the load will be discharged against the regulator and its weight will be sufficient to maintain the closer open for a relatively long period of time and amply sufficient to permit the clearance of the bucket, which is a particularly advantageous point when the machine is weighing such materials as wet coal. When the weights 7 and 8 overcome the amount of force applied to the regulator R by the material, they will promptly shut the closer, and as this action takes place all parts of the material will gravitate from the regulator, which is also given a jar by the shutting of the closer, to facilitate the removal of particles of material therefrom.

In conjunction with the beam B, I provide a resistance member, which is in the form of a weight T, immersable in a fluid-containing receptacle 55, said weight having a longitudinal rod 55', which is pivoted at its upper end between ears on the face of the beam-weight W. (See Figs. 1, 2, and 3.)

When the beam-weight W is upon the support 2', which extends from the base 2, the weight T, which acts as a supplemental counterpoise member, will be wholly immersed in a fluid within the receptacle 55, the result being a considerable loss in efficiency of said weight. As the poising side of the beam descends, it being that part of the beam to the left of its axis, the weight W of course will be caused to rise, whereby the supplemental counterpoise-weight or resistance member T will be slowly removed from the fluid, and will thereby gradually increase in efficiency, so that there is applied to the bucket a progressively-increasing resistance for preventing its rapid descent, which is very important at the commencement of the poising period when the weight T is wholly removed from the fluid in the receptacle 55, as indicated by the dotted lines in Fig. 3, at which time its full effect is applied to the poising side of the weighing mechanism, and in effect to the bucket, so that it cannot be carried prematurely below the so-called "poising-line" with an underload.

For preventing the application of the resistance too suddenly to the bucket or load-receiver G, I provide a second and much smaller weight T'', which extends centrally from the larger weight T, and which remains partially immersed in the fluid when the weight T has been removed therefrom.

To prevent entrance of dust or dirt to the interior of the fluid-containing receptacle 55, I provide a cover or cap 56, which has on its upper face a projecting collar 57 and which embraces the rod and through which may be passed a binding-screw 58 to hold the cap or collar in position, and said screw may be loosened to raise the cap to introduce a fluid into the receptacle 55, it also forming a means of locking the cap 56 to the rod 55'.

It will be understood that the fluid within the receptacle 55 constitutes a means for varying the efficiency of the counterpoise-weight T as the latter reciprocates, and that at the commencement of the poising period said weight will have practically attained its highest efficiency, so that the bucket can be brought to a true poise by the drip-stream with great nicety and to avoid its being carried too quickly below the poising-line.

For tripping the latch 13, to which I have hereinbefore referred, I provide a latch-tripper 60, which is in the form of a rigid projection on the thrust-rod 37 and which has a movement into engagement with the laterally-projecting pin 61 on said latch at the close of the weighing operation to depress the latch and disengage it from the cooperative arm 14 of the rocker 10.

The operation of the hereinbefore-described machine, briefly, is as follows: Fig. 2 represents the positions occupied by the several parts at the commencement of operation, the two stream-reducers 15 and 16 and the valve 17 being in their wide-open positions and the closer L being shut and held in such position by the latch 13, which is in engagement with the arm 14 of the rocker 10. This being the case, a stream of material of relatively large volume will flow from the hopper H and gravitate into the bucket G. When a certain proportion of the load has been received by the bucket, it and the poising side of the scale-beam B will descend, so that as said beam falls away from the rod 37 the closure of the valve 17 may be effected by the dropping of the counterweighted valve-operating arm 35. As said valve thus closes the two stream-reducers 15 and 16 will be moved toward each other for progressively diminishing the volume of the supply-stream, which latter is of very small volume at the commencement of the drip period. At the commencement of the drip period the by-pass 40 on the beam B will be engaged by the coacting rod 41 on the valve-shaft section 25, as represented by Fig. 4, to hold the valve 17, and consequently the two stream-reducers 15 and 16. When the drip-stream completes the load, the beam B will be caused to pass below the poising-line, carrying the stop 40 therewith and below the plane of oscillation of the rod 41, thereby releasing the valve 17, so that it may promptly shut and the two stream-reducers 15 and 16 be moved toward each other. On the final closing movement of the valve the tripper 60, which is connected thereto, will be forced downward and impinging against the laterally-extending pin 61 on the latch 13 will depress said latch and disengage it from the coöperating arm 14 on the rocker 10, thereby freeing the closer L of all restraint, so that it can be instantly forced open by the weight of the contents within the bucket G. On the complete discharge of the bucket-load the closer will be shut by its counterweights 7 and 8, and the several operative parts of the machine will be then returned to their primary positions.

Having described my invention, I claim—

1. The combination of a supply-hopper; a vertically-reciprocatory stream-reducer; and a cut-off valve for said hopper, supported for movement independently of and connected with said stream-reducer.

2. The combination, with a load-receiver, of stream-supplying means therefor; a pair of stream-reducers each consisting of a plate supported for vertical movement and having at its end a flange; and means for simultaneously reciprocating said plates in opposite directions, to thereby move the flanges toward and from each other.

3. The combination, with a load-receiver, of a supply-hopper; a plurality of vertically-reciprocatory stream-reducers on said hopper; and means for moving said stream-reducers toward and from one another.

4. The combination, with a load-receiver, of a supply-hopper; a plurality of stream-reducers supported for parallel reciprocatory movement; and means for moving said stream-reducers toward and from each other.

5. The combination, with a load-receiver, of stream-supplying means therefor; a vertically-reciprocatory stream-reducer; a cut-off; and a connection between said cut-off and the stream-reducer.

6. The combination, with a hopper; of a plurality of reciprocatory members operative in conjunction with said hopper and each having a flange, said flanges being movable toward and from each other; a valve; and actuating means for said reciprocatory members and valve.

7. The combination, with a load-receiver, of stream-supplying means therefor; a vertically-reciprocatory stream-reducer; a valve having an arm connected to said stream-reducer; and valve-actuating means.

8. The combination, with a load-receiver, of stream-supplying means therefor; a series of reciprocatory stream-reducers; a valve having oppositely-disposed arms connected, respectively, to said stream-reducers; and valve-actuating means.

9. The combination, with a hopper having a series of pins projecting therefrom; of a plurality of stream-reducers longitudinally slotted, the slots of which embrace said pins; and means for oppositely reciprocating said stream-reducers.

10. The combination, with weighing mechanism including a shiftable load-discharge member having a stop, of stream-supplying means; a vertically-reciprocatory stream-reducer provided with a stop coöperative with the first-mentioned stop; and a valve.

11. The combination, with weighing mechanism including a shiftable load-discharge member having a stop, of stream-supplying means; a reciprocatory stream-reducer; a valve and its shaft; and a stop sleeved on said shaft and connected to the stream-reducer and coöperative with the first-mentioned stop.

12. The combination, with weighing mechanism including a shiftable load-discharge member having a stop, of stream-supplying means; a vertically-reciprocatory stream-reducer; a valve and its shaft; and a longitudinal sleeve on said shaft, connected to said stream-reducer and having a stop coöperative with the first-mentioned stop.

13. The combination, with weighing mechanism including a bucket having a closer, of means comprehending a latch for normally holding said closer against movement; a stop operative with said closer; stream-supplying means; a vertically-reciprocatory stream-reducer; a valve and its shaft having a stop coöperative with the first-mentioned stop and connected to the stream-reducer; a connection between said stream-reducer and valve; and a latch-tripper connected to the valve-shaft.

14. The combination, with weighing mechanism including a shiftable load-discharge member, of a discharge-conduit located below the weighing mechanism; a regulator disposed in said conduit and adapted to be acted upon by a load of material; and a flexible connector between said regulator and shiftable load-discharge member, whereby the regulator is freely movable in the discharge-conduit.

15. The combination, with weighing mechanism comprehending a bucket having a discharge-outlet; of a closer for said outlet, hinged to the bucket; a discharge-conduit located below the weighing mechanism; a regulator disposed in said conduit and adapted to be acted upon by a load of material; and a flexible connection between said regulator and the closer, whereby the regulator is freely movable in the discharge-conduit.

16. The combination, with a load-receiver having a closer, of a discharge-conduit situated below the load-receiver; a conical regulator disposed in said discharge-conduit and adapted to be acted upon by a load of material emptied from the load-receiver; and a flexible connection between said regulator and the closer, whereby the regulator is freely movable in the discharge-conduit.

17. The combination, with a load-receiver having a closer, of a discharge-conduit situated below said load-receiver; a regulator disposed in said conduit and adapted to be acted upon by a load of material emptied from the load-receiver; a rigid stem on the regulator;

and a flexible connection between the same and the closer, whereby the regulator is freely movable in the discharge-conduit.

18. The combination, with a load-receiver having a closer, of a discharge-conduit situated below the load-receiver; a regulator having a rigid stem; and a chain connected, respectively, to said stem and the closer.

19. The combination, with a load-receiver having a closer, of a discharge-conduit situated below said load-receiver; a conical regulator disposed in the discharge-conduit at a point relatively remote from the closer, said regulator having a rigid stem; and a chain connected, respectively, with said stem and closer.

20. The combination, with weighing mechanism embodying a load-receiver and a supporting scale-beam therefor having a counterbalance-weight adapted to exert a constant force equal to that of the load-receiver and its predetermined charge, of stream-supplying means; a stream-controller; connections between the weighing mechanism and stream-controller, for governing the action of the latter; a fluid-receptacle; and a resistance member consisting of weights of two different sizes immersable in the fluid in said receptacle and connected to one of the members of the weighing mechanism.

FRANCIS H. RICHARDS.

Witnesses:
FRED. J. DOLE,
F. N. CHASE.